United States Patent [19]

Morales-Garza

[11] Patent Number: 5,223,923

[45] Date of Patent: * Jun. 29, 1993

[54] CELLULAR REPEATER STATIONS IN A WIRELESS AUDIENCE RESPONSE SYSTEM FOR SATELLITE COMMUNICATION

[75] Inventor: Fernando Morales-Garza, Monterrey, Mexico

[73] Assignee: TV Answer, Inc., Reston, Va.

[*] Notice: The portion of the term of this patent subsequent to Mar. 31, 2009 has been disclaimed.

[21] Appl. No.: 741,250

[22] Filed: Jul. 26, 1991

Related U.S. Application Data

[63] Continuation of Ser. No. 390,073, Aug. 7, 1989, Pat. No. 5,101,267.

[51] Int. Cl.⁵ .............................................. H04B 17/00
[52] U.S. Cl. ......................................... 358/84; 455/2; 455/5.1; 455/12.1
[58] Field of Search .................... 358/84; 455/2, 4, 5, 455/6, 10, 12, 4.1, 4.2, 5.1, 6.1, 12.1; 370/95.1

[56] References Cited

U.S. PATENT DOCUMENTS

| | | | |
|---|---|---|---|
| 3,559,919 | 2/1971 | Sass | 244/1 |
| 4,451,700 | 5/1984 | Kempner et al. | 179/24 S |
| 4,506,383 | 3/1985 | McGann | 455/17 |
| 4,577,327 | 3/1986 | Nambu | 455/15 |
| 4,591,906 | 5/1986 | Morales-Garza et al. | 358/84 |
| 4,628,506 | 12/1986 | Sperlich | 370/118 |
| 4,630,108 | 12/1986 | Gomersall | 358/84 |
| 4,910,792 | 3/1990 | Takahata et al. | 455/10 |
| 4,926,255 | 5/1990 | Von Korhorn | 358/84 |
| 4,943,963 | 7/1990 | Waechter et al. | 455/2 |
| 5,036,389 | 7/1991 | Morales | 358/84 |
| 5,101,267 | 3/1992 | Morales-Garza | 358/84 |

Primary Examiner—Reinhard J. Eisenzopf
Assistant Examiner—Edward Urban
Attorney, Agent, or Firm—Laurence R. Brown

[57] ABSTRACT

A network of local area audience response systems is coupled together at a central audience response processing station by means of a satellite communication system for real time audience response analysis, nationally or internationally. Each local area station and each response unit may be identified and verified by allocation of specific time slots for response, preferable synchronously related to a TV picture program transmission carrying the audience questions to be answered. Wireless transmission of the question and answer signals in digital format of beeps of a single frequency keep transmission channels narrow. The system may be operated in conjunction with TV broadcasting or independently.

8 Claims, 8 Drawing Sheets

REPEATER EQUIPMENT

REPEATER EQUIPMENT

Fig. 3

RESPONSE UNIT

Fig. 4

RESPONSE UNIT
Fig. 5

Fig. 7
POWER LEVEL AND FREQUENCY SYNTHESIZER

CELLULAR REPEATER STATIONS IN A WIRELESS AUDIENCE RESPONSE SYSTEM FOR SATELLITE COMMUNICATION

This is a continuation of my co-pending application, U.S. Ser. No. 07/390,073, filed Aug. 7, 1989 for "Wide Area Real-Time T-V Audience Polling System with Local Area Station Linked by Satellite", now U.S. Pat. No. 5,101,267, issued Mar. 31,1992.

TECHNICAL FIELD

This invention relates to two way audience polling communications between different audience response units such as TV receiver stations, and more particularly it relates to a communication system permitting questions to be sent to and answers to be received from individual response stations for processing at a central processing location.

BACKGROUND ART

Among prior art polling, voting and two-way communication system is that of U.S. Pat. No. 4,591,906 to Fernando Morales-Garza, et al., May 27, 1986, which disclosure is incorporated herein in entirely to simplify the scope of the present disclosure while enabling those in the art to practice this invention, and to better clarify the nature and scope of the present invention. That system permits answers to be sent by single frequency beeps from TV receiver audience response stations to a central processing station, at a TV transmitter studio site for example. Specific response time slots identify the answering units and compensation is made for travel time of the radio signals.

Also known in the art are various local remote control units for operational control of TV receivers by infra red (IR) wireless systems. One such system is that of co-pending application Ser. No. 07/368,951 filed Jun. 13, 1989, now abandoned, by Fernando Morales, et al. for Wireless Remote Control of Cursor Superimposed on TV Picture, which permits answers to be formulated by a TV viewer in a specified location on a TV screen and transmitted to a central analysis station.

A system for processing of audience response answers at a central station is described in U.S. Pat. No. 4,755,871 to Fernando Morales-Garza, et al., Jul. 5, 1988. This provides for inexpensive control of time slots at the response unit station by synchronization of timing with a TV program signal incorporating an audience question.

However, these prior art systems have not been able to process answers over a wide territorial range, such as for example nationally over the fifty states of the USA, or internationally for real time analysis.

It is therefore a general objective of this invention to provide a wireless communication system for audience polling, processing, analyzing and identifying responses, capable of feeding back verified responses for the information of the polled audiences, either together with a transmitted TV program or independently in an audience polling mode of operation.

A more specific objective of this invention is to use narrow band rf communication beeps capable of identifying responder TV stations, or the like, with time slot identification over wider territorial ranges than those of the aforesaid Patent 4,591,906, for example for nation-wide or international polling with current polled results appropriately analyzed and verified.

Another specific objective of this invention is to provide by means of satellite communications a wireless processing system for real time audience polling over long distances, wherein specific TV receiver station, or like, response units can be identified, verified and analyzed for real time processing of responses from polled audiences.

Other objects, features and advantages of the present invention will be found throughout the following description, drawings and claims.

DISCLOSURE OF THE INVENTION

A set of local area audience analysis repeater stations, each communicate with a family of response units operating on the beep principle of U.S. Pat. No. 4,591,906. Questions and answers are communicated, processed and verified over local areas such as surrounding a TV transmitter site, with the capability of isolating and identifying each response unit in the audience. The repeater stations then communicate by intermediate satellite transmission channels to a central data center that receives the local signals to consolidate them into a nation-wide response result, for example. The data center also can process questions directed to the repeaters for local polling in individual time slots identifying each of the response units, which are typically TV receiver stations. Further verification, formatting, repeating and storage of answers, and real time feedback of response data to the polled audience takes place at the data center, typically a national or international processing station. Local response units are compatibly operated at the response unit site with cable systems, VCR systems and ratio TV signals from local transmitters. Preferably these response units are controlled by way of wireless remote control units using infra red communication links. Frequency synthesizing equipment at the response unit sites keep the cost of response units low while accurately controlling the timing of ID time slots and system synchronization. Travel time of radio waves is accounted for in the system to provide accurate identity of the individual response units through assigned synchronous time slots.

The questions and answers are digitalized in local data processors for synchronous system transmission and for satellite communication purposes. They are sent on a single frequency narrow band ratio transmission channel. Real time clock signals are incorporated into the system along with the questions to identify real-time responses for verification of responses that might include erroneous answers from VCR or re-broadcast signals at the response unit site.

Typically this system may be used for national or international audience polling, for weather condition polling, for price or market surveys and other financial data processing, or for educational purposes such as grading examinations from a network of colleges or other schools, as well as for billing and accounting purposes for receipt of special programs. It is unique in that data from a plurality of local areas is assembled by way of satellite transmission channels for producing a large polling area suitable for national or international audience surveys with real time processing making possible relay of current responses to the polled audience.

BRIEF DESCRIPTION OF THE DRAWINGS

Throughout the drawings similar reference characters are used to facilitate comparison between the respective figures and system elements. In the drawings.

THE PREFERRED EMBODIMENTS

Figure 1:
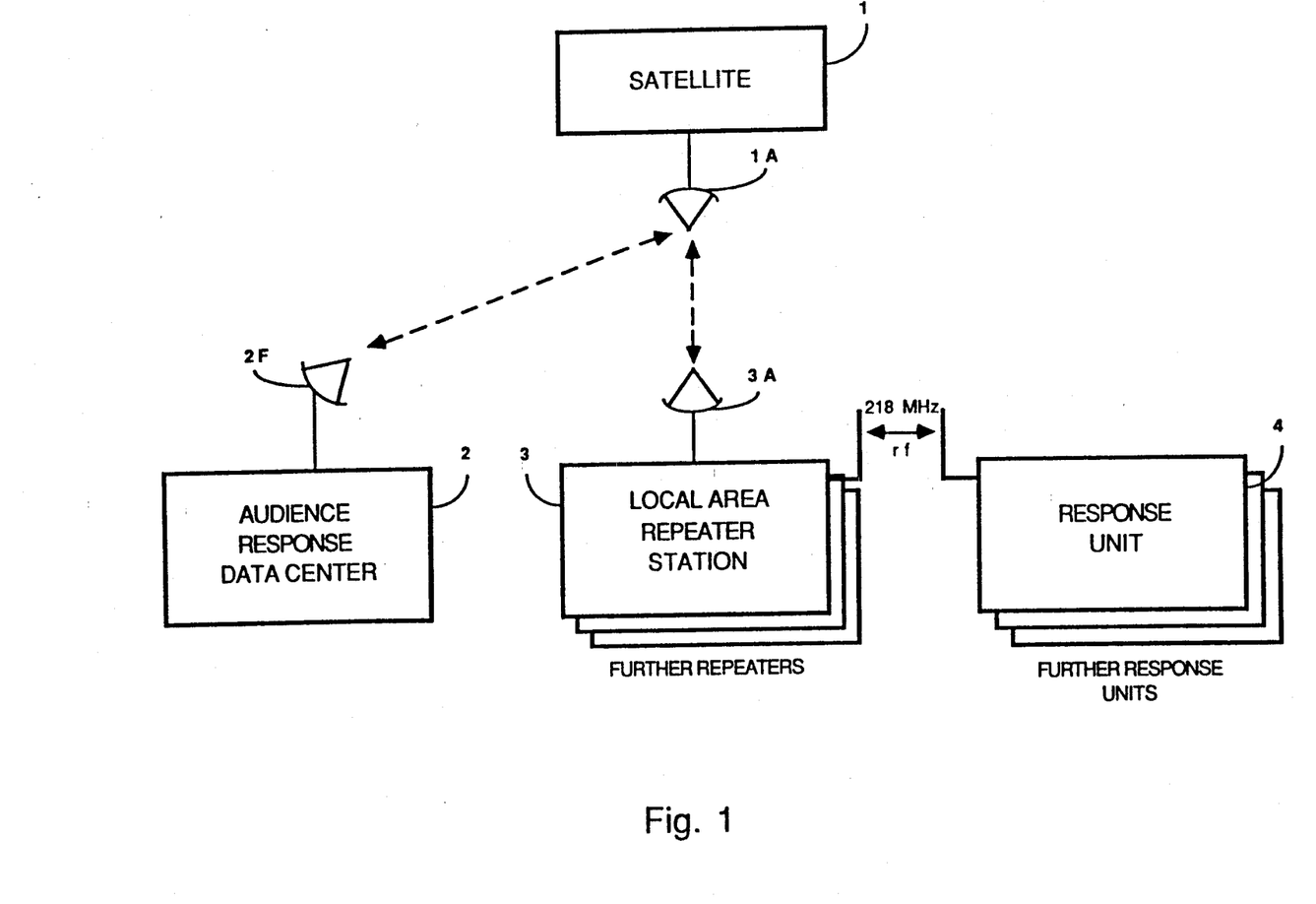
FIG. 1 is a block system diagram of the satellite communication audience polling system afforded by this invention.

In FIG. 1, the general system organization of the wide area satellite communication audience response system afforded by this invention is shown. The satellite station 1 through conventional communication channel links receives and repeats or retransmits data in either direction between the audience polling data center 2 and the local area repeater stations 3 by means of directional antennas 1A, 2F and 3A respectively. The audience polling data center thus is not restricted in location and may for example be a national or international audience polling center for communication with a set of local area audience polling repeater stations 3 located typically in cellular array locations throughout the designated area covered by the data center 2.

The audience polling questions and answers are centrally transmitted and received at the data center 2 for verification, processing, formatting, storage and if desired for retransmission in real time to the audience being polled. Thus questions are transmitted from the data center to the local area repeater stations via antenna 2F to the satellite antenna 1A and then to the local station antenna 3A. These questions may be formulated as part of a TV picture, or may be explicitly an audience polling system separate from TV programming.

The local repeater stations, for example at one site, then locally process the questions and answers on a narrow band single frequency channel, such as 218 MHz, in the form of beeps located in timing slots explicitly identifying the various response units 4 being processed in a local family audience, for billing, identification and verification purposes. Thus, the audience response is returned in real time through satellite station 1 to the central data center 2, with processing and verification at both the local area repeater stations 3 and the data center 2, where system wide audience response data may be analyzed and formatted. The directional parabolic antennas 2F and 3A from specific locations establish a system in which widely separated local area repeater stations can be coordinated and processed from a single central data center and control station.

Figure 2:
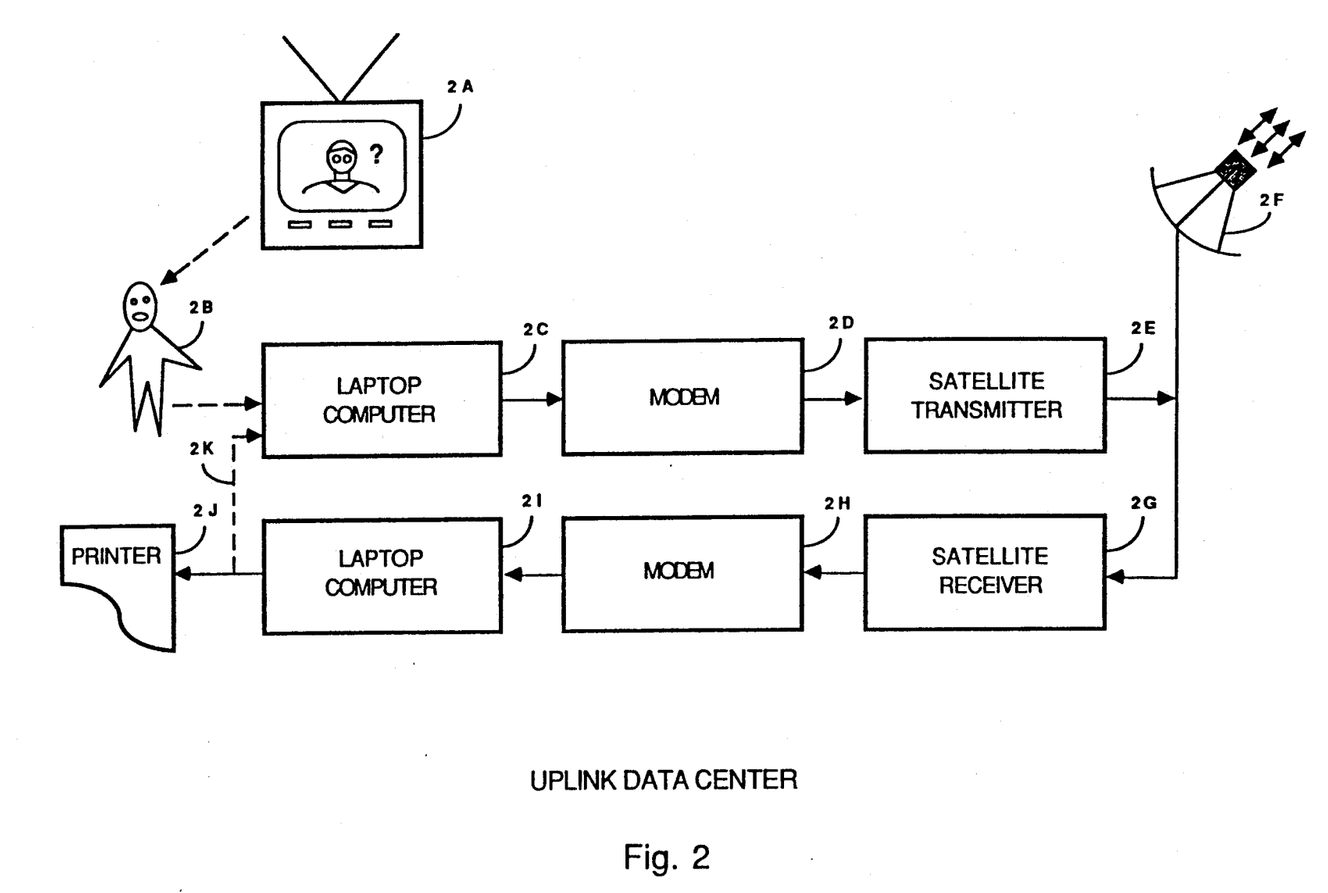
FIG. 2 is a block system diagram afforded by this invention of a data processing center for sending audience questions and receiving audience responses from a plurality of localized systems, such as city TV station audiences, to produce nationwide audience response data, for example.

At the data center 2, as shown in FIG. 2, a question (?) that may be associated with a TV picture on the TV receiver 2A screen is converted by operator 2B or corresponding automated equipment into a synchronously timed digital signal fashioned for processing in the audience response system, such as that in the U.S. Pat. No. 4,591,906. In a semi-automatic system as shown, the operator by way of a personal computer 2C for example programs the digital question data which via modem 2D, transmitter 2E and directional antenna 2F is communicated on a transmission link through a satellite station 1, and to all the response units using a plurality of repeater stations 3. The response units answer the question using a specific time slot for each one, similar to the system described in the U.S. Pat. No. 4,591,906.

Similarly answers, verified at local repeater stations, are received from the satellite communication link at receiver 2G for processing through modem 2H and computer 2I for formatting and printout at printer 2J for example. The answers may also be incorporated in the TV picture signal going out for the benefit of real time monitoring by the polled audiences, as indicated by connection 2K.

Figure 3:
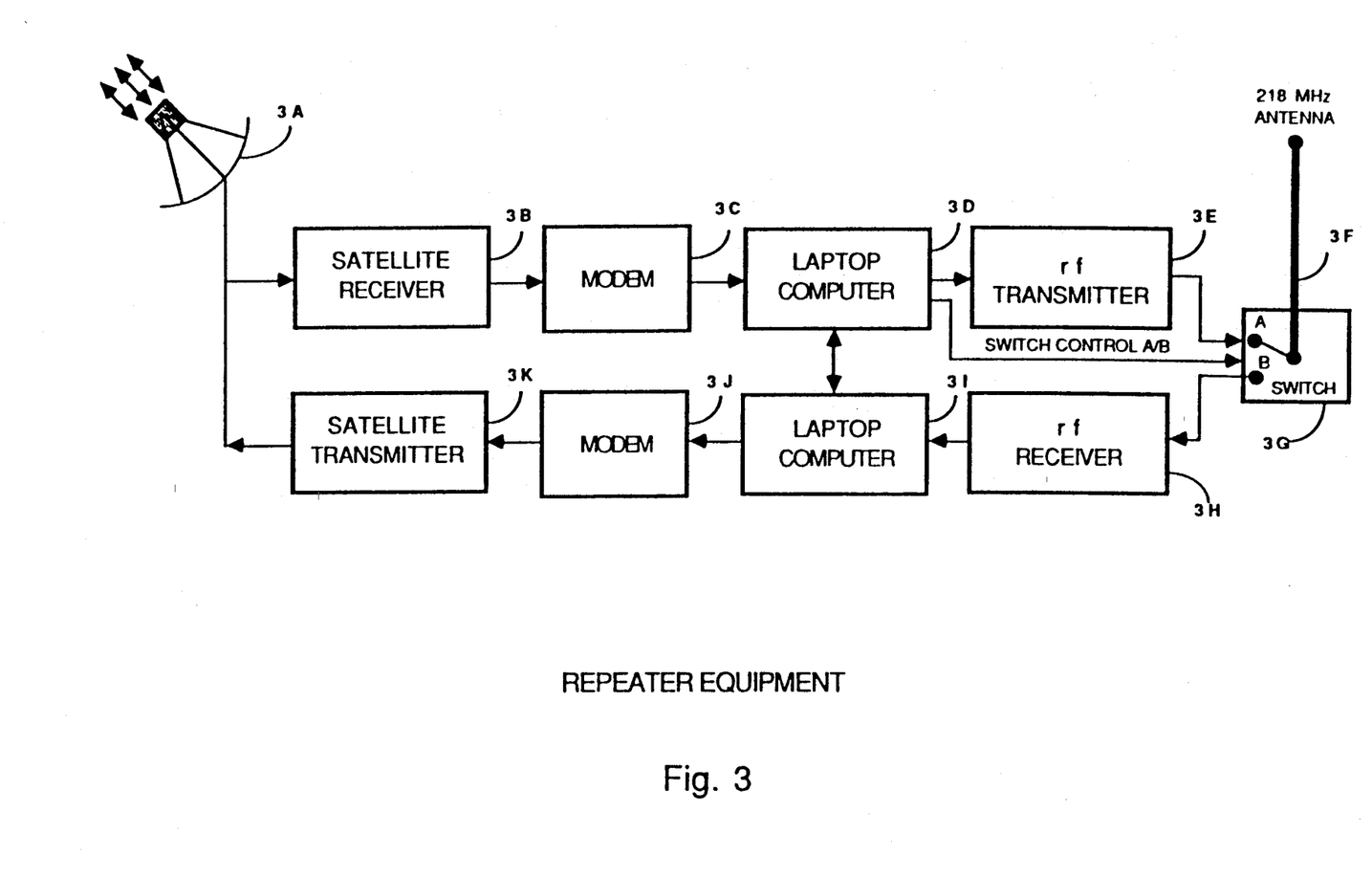
FIG. 3 is a block system diagram of local area repeater station equipment afforded by this invention to service local audience questions and responses.

Typical local area repeater transceiving equipment is shown in FIG. 3. Thus signals (questions) received from the satellite at antenna 3A are processed in receiver 3B, modem 3C, computer 3D and local rf transmitter 3E operating at 218 MHz for transmission from antenna 3F. In this transmitting mode the transmit-receive switch 3G is set to transmit position A. The reception default mode of switch 3G at B permits reception of answers at receiver 3H for verification and processing through computer 3I, modem 3J and transmitter 3K which communicates with the satellite data processing link. Summary or totalized audience response may be derived at computer 3I for example and verified. Satellite based discrimination equipment may distinguish between the transmissions from various local repeater stations to prevent interference or to permit simultaneous transmissions on separate frequency bands for example. Preferably narrow band beep signals of the type disclosed previously are employed with all local repeater stations communicating on the same narrow frequency band through the satellite station. In this respect the local repeater stations all may be identified and slot time controlled in communicating of the central data station in the manner set forth in U. S. Pat. 4,591,906.

Figure 4:
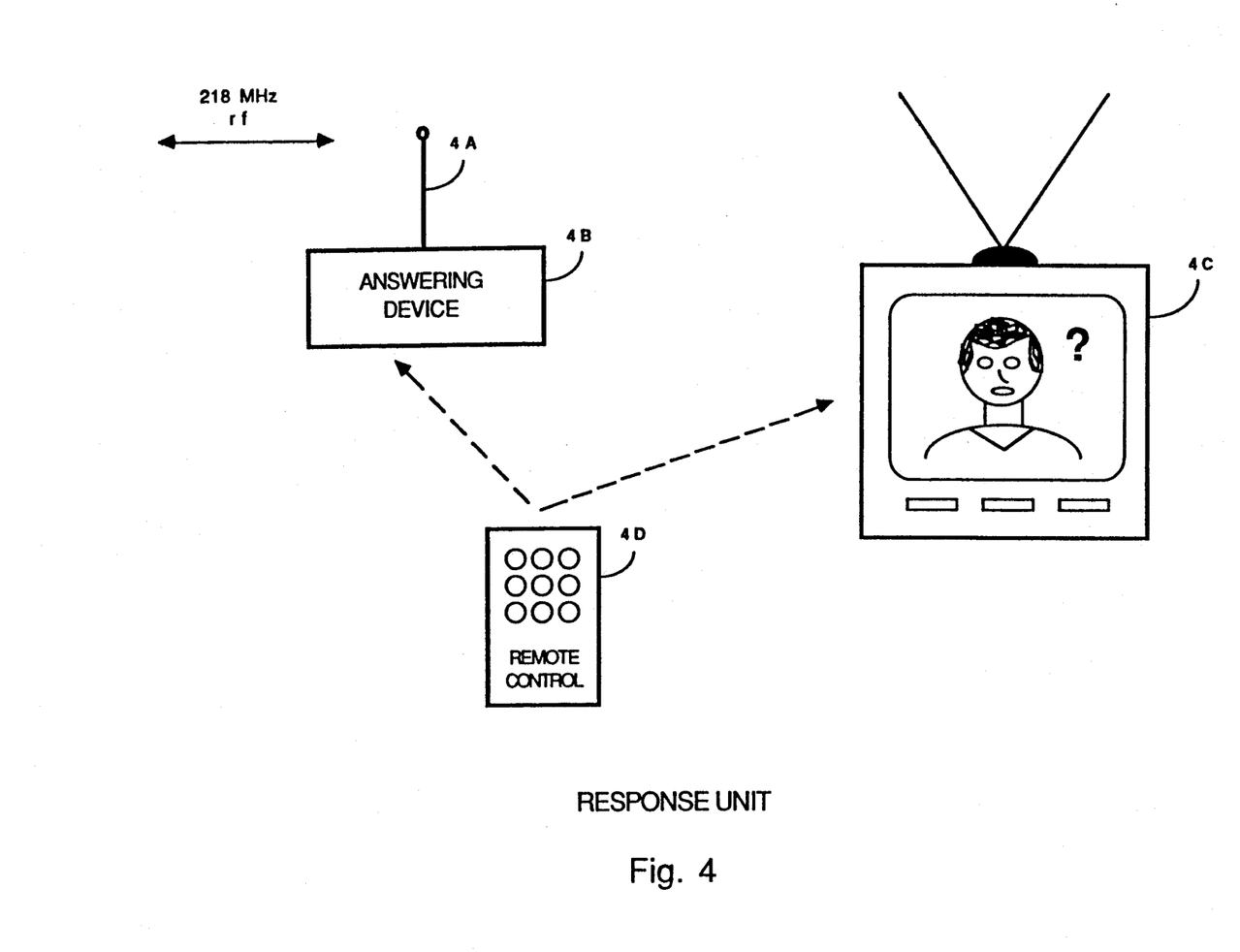
FIGS. 4 and 5 are block diagrams of several response unit embodiments afforded by this invention, typically TV receiver stations about a local TV transmitting station site provided with audience response processing equipment.

A simplified response unit is shown in FIG. 4, where a remote control unit 4D synchronously operated with the TV receiver 4C may provide answers through answering device 4B, preferably that of the aforementioned copending application, to be sent to the local repeater station on the 218 MHz beep frequency channel from the response unit transmitting antenna 4A.

Figure 5:
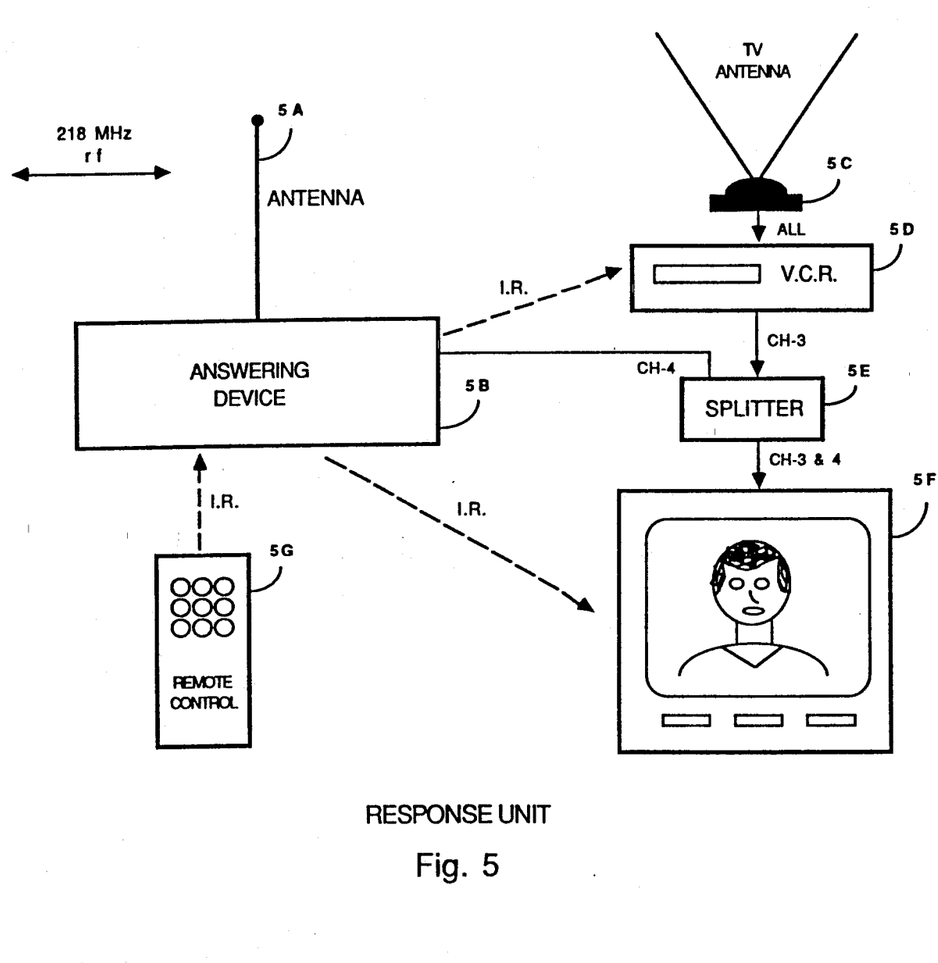

In the response unit of FIG. 5, the answering device 5B may operate independently from a TV program signal format, and may isolate its own TV channel using for example the frequency of channel 4, which can be mixed with other channels in conventional splitter 5E to provide a suitable presentation on the screen of TV set 5F. Thus the system is compatible with cable converter 5H, local rf broadcast signals received on antenna 5C and VCR 5D, all of which may operate conventionally on channel 3.

The responses are preferably made by IR wireless remote control unit 5G which controls answering device 5B for formulating response beeps for transmission at antenna 5A on the 218 MHz beep channel to the local repeater station.

Figure 6:
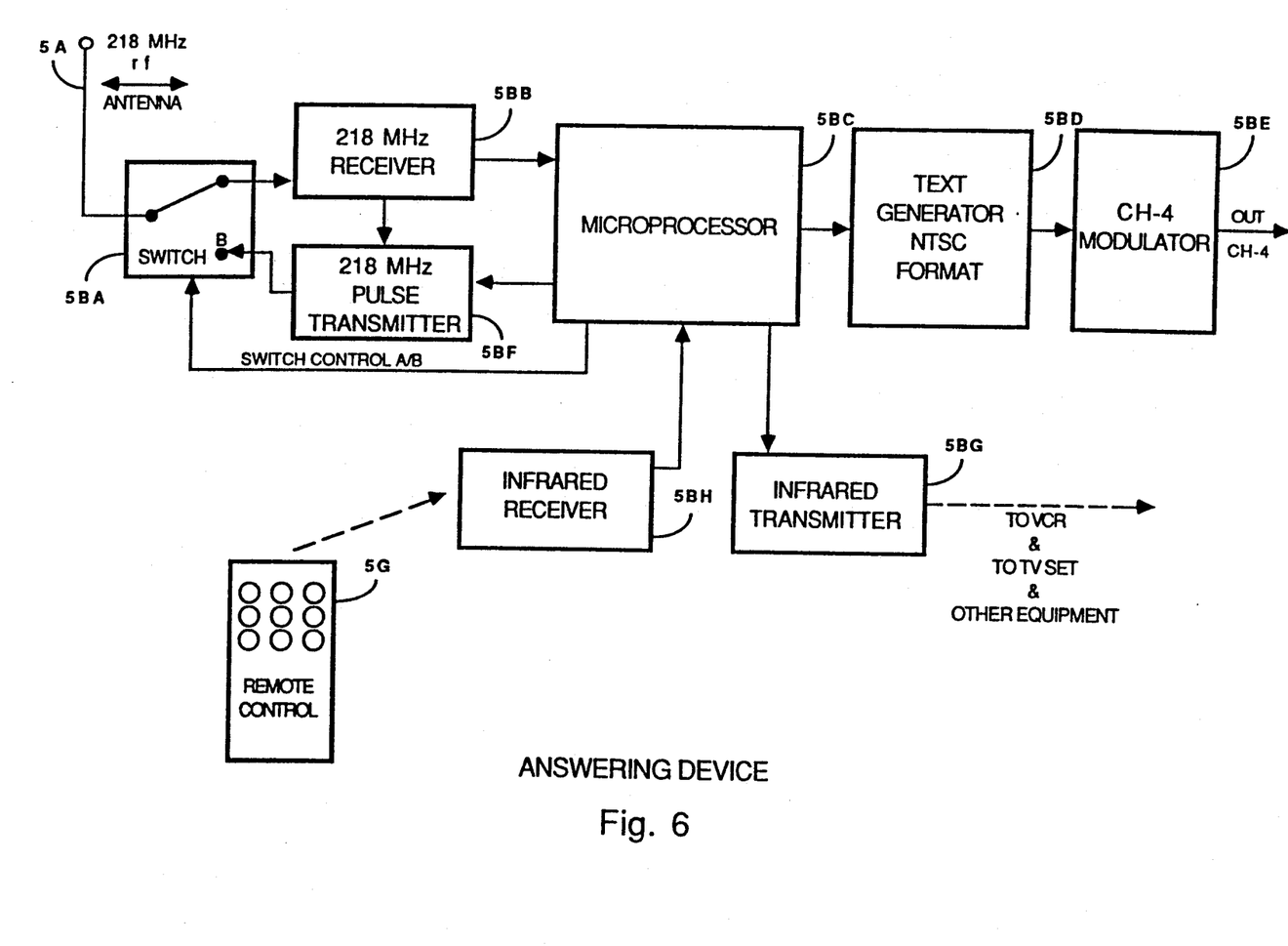
FIGS. 6 and 7 are block diagrams of some elements of the answering device of the audience response unit as afforded by this invention.

A preferred system for the response system is shown in FIG. 6. The antenna 5A receives information from the local repeater station and by way of transceiver switch 5BA selects receiver 5BB for processing incoming signals for use by microprocessor 5BC, which retains the signals in its memory. If the data comprises a real time question, the microprocessor 5BC is programmed to read the infrared receiver 5BH and relay through pulse transmitter 5BF and switch 5BA the response beeps to the repeater station.

For information related to TV scheduling sent to the receiver 5BB and retained in the storage of microprocessor 5BC, the text generator 5BD and channel 4 modulator 5BE presents the viewer appropriate information and sets the equipment to accept corresponding responses from the viewer unit 5G. The remote control device 5G also serves by way of infrared transmitter 5BG to control channel changes in the TV set, and to control the VCR an any other IR responsive local equipment at the response unit station.

Figure 7:
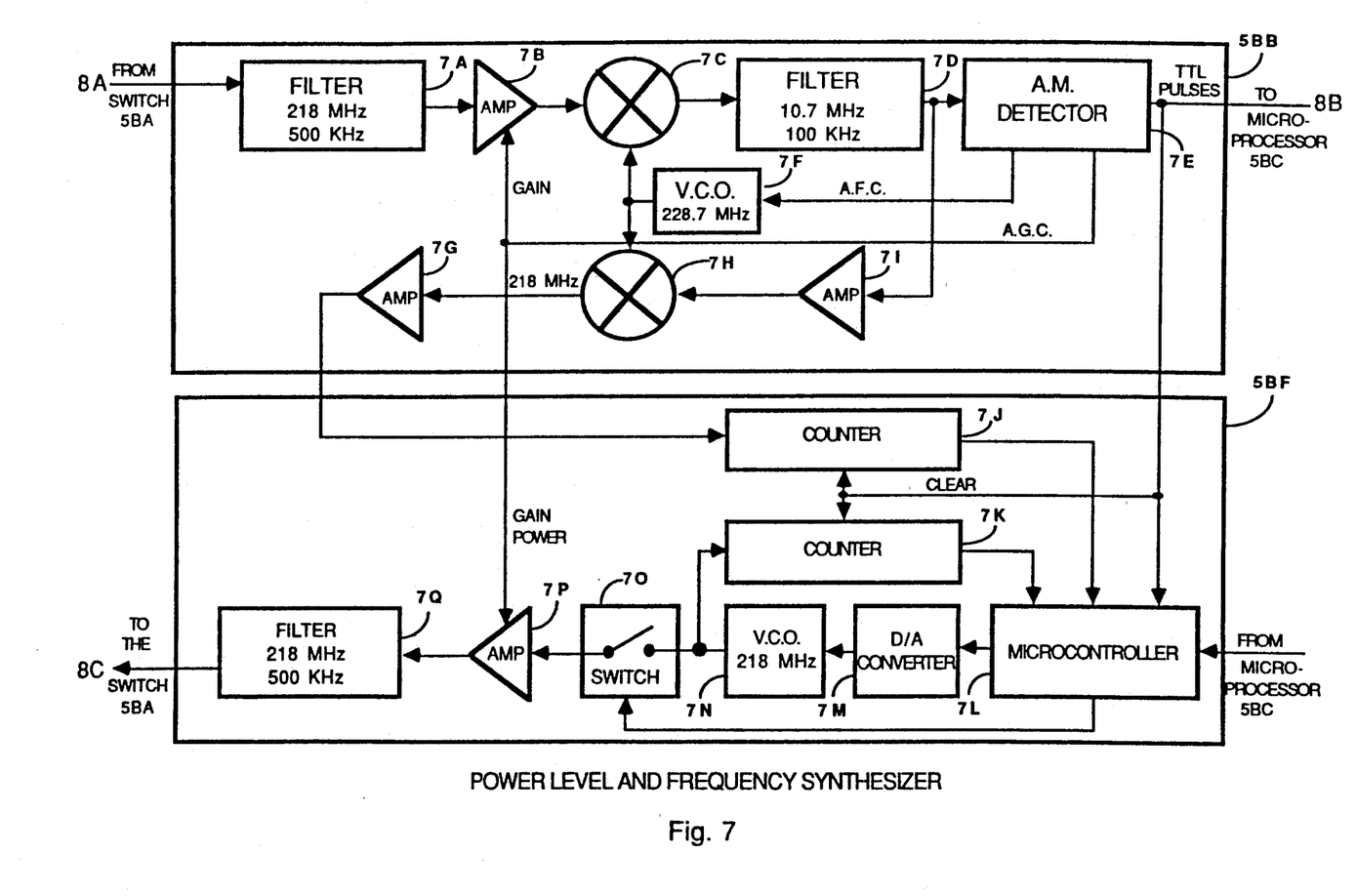

In FIG. 7 details of the transmitter 5BF and receiver 5BB are provided to both control the power for different strength signals received and to control the synchronization of the pulse time slots by synthesizing the received signal as a reference frequency, in similar manner disclosed in U.S. Pat. 4,755,871. As viewed with the waveforms of FIG. 8, the incoming rf signal 8A from the local repeater station is processed in filter 7A to remove any interfering signals. Amplifier 7B by way of an AGC control circuit generates a standard level signal at mixer 7C. Using filter 7D and a m detector 7E, a signal 8B is generated for use in the microprocessor 5BC.

Figure 8:
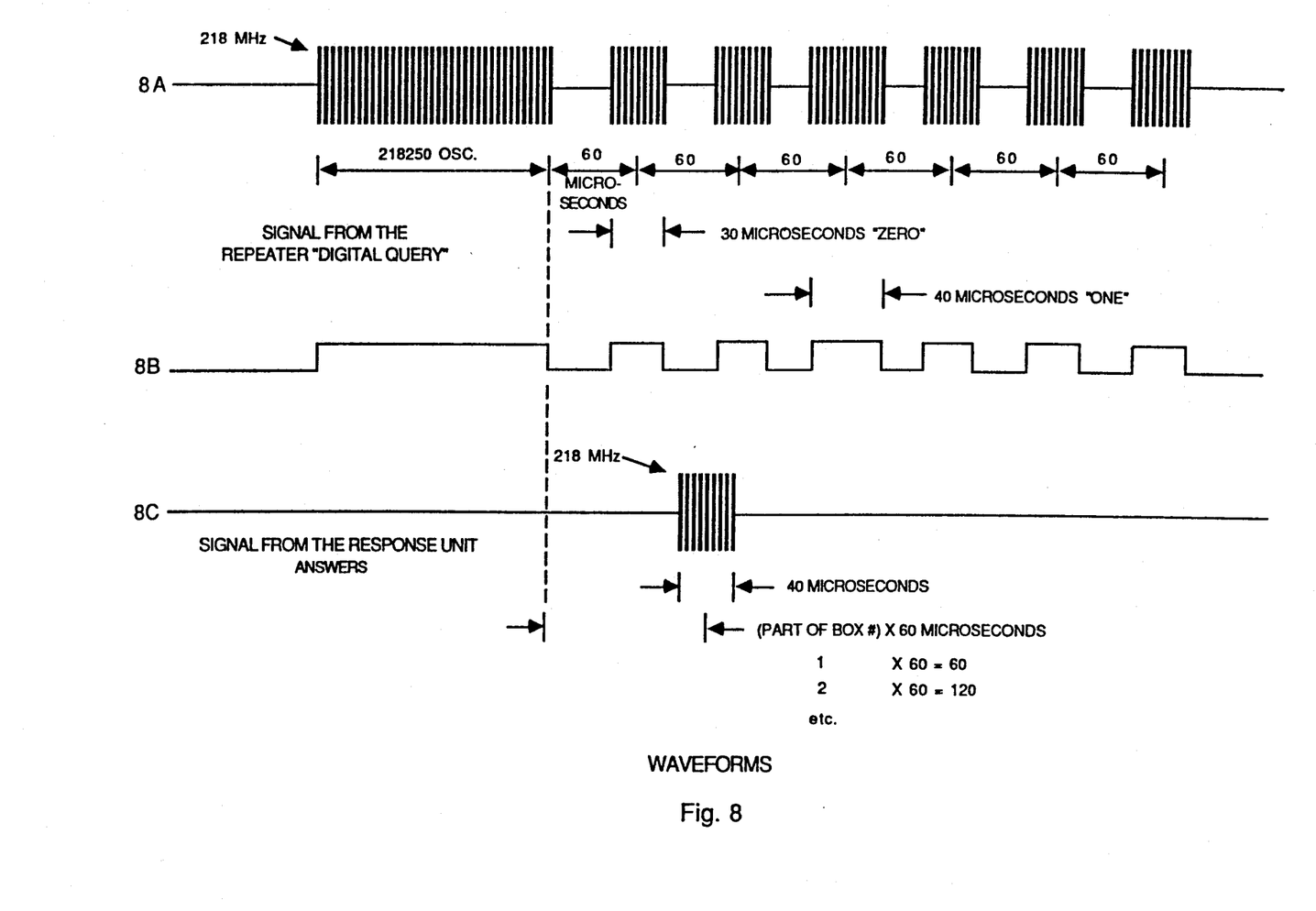
FIG. 8 is a waveform chart outlining operational features of the repeater station equipment.

The a m detector 7E also generates AGC and AFC signals for gain and frequency control purposes to fine tune the voltage controlled oscillator (VCO) 7E, and to control the gain of amplifiers 7B and 7P. Thus, the locally controlled or synthesized frequency at 7F is mixed again with the signal 8A at mixer 7H and amplified at 7G for processing in counter 7J to count the number of oscillations. This counter 7J and also counter 7K are cleared every time the signal 8B returns to zero.

Counter 7K counts the oscillations from VCO 7N as an input to microcontroller 7L, which by way of digital to analog converter 7M controls the transmission frequency of VCO 7N by comparing the counts on the two counters. Only when the counts are equal can the microcontroller transmit a radio frequency pulse 8C using switch 7O and power amplifier 7P as filtered through narrow band filter 7Q. Thus the output beep pulse to the local repeater station is carefully controlled in frequency and amplitude.

The signal 8A coming from the satellite preferably contains a coded real time clock signal inserted at the data center computer with the question for verification of live real time conditions by comparing the question and answer times in a clock portion of the microprocessor 5BC at the response unit or in the computer 3I of the local repeater station.

It is therefore evident that this invention advances the state of the art and provides a simple operative audience response communication system that can operate in real time nationally or internationally through satellite communication channels that gather signals from a set of local audience response processing and repeater stations for consolidation in a central data processing center. Therefore the features of novelty believed descriptive of the spirit and scope of the invention are defined with particularity in the following claims.

I claim:

1. The method of processing real time audience response analysis from a plurality of local areas distributed over an extensive area comprising the steps of:
    providing a set of local area question and answer processing audience response units and a local area response unit processing station communicating with the audience response units to determine local area audience response,
    providing a central audience response data processing station for processing the audience response from all the local area stations,
    providing a satellite communication system between said central station and the local area station with means for processing audience responses over said extensive area in real time, and
    distributing said plurality of local area stations throughout a national network of audience response stations.

2. A wireless audience response satellite communication system coupling for intercommunication at least two stations of which one is a local area repeater station, which comprises in combination:
    local area subscriber station control means for receiving and processing r-f audience participation signals from a family of local audience response units,
    bi-directional r-f transmission means for relaying received and processed data from said local audience response units modulated on a carrier frequency to a satellite station by means of a directional antenna directed toward said satellite station for audience response communications in said system,
    TV program transmission facilities for sending video programming materials as a part of a TV picture to said local audience response units containing queries to be responded to by the audience at said local response units;
    a local source at the repeater stations for distributing TV signals containing said programming materials to the family of audience response units,
    means for incorporating into TV signals distributed to the family of local response units said queries to be answered by the viewing audience at the local response units, and
    means for incorporating said queries in at least one location visible on a video screen raster synchronously timed with the TV signals to provide a menu format with synchronously positioned answer locations as a format for soliciting synchronously timed audience responses.

3. A wireless audience response satellite communication system coupling for intercommunication between at least two stations of which one is a local area repeater station, which comprises in combination:
    local area subscriber station control means for receiving and processing r-f audience participation signals from a family of local audience response units,
    bi-directional r-f transmission means for relaying the received and processed audience participation signals modulated on a carrier frequency to and from said local audience response units to a satellite station by means of a directional antenna directed from the repeater station toward said satellite station for processing audience response communications in said system, means for receiving remote audience response signals from said satellite station superimposed upon said carrier frequency, means for retransmitting received said audience participation signals from said local audience to said satellite station on said carrier frequency, and means for synchronizing the carrier frequency with synchronizing signals received from said satellite station.

4. The repeater station of claim 3 further comprising audience response analysis means, means for transmitting analyzed audience response data back to the local audience response units, and means for transmitting analyzed audience response data from a first subscriber station through said satellite station to a remote subscriber station.

5. The repeater station of claim 3 wherein said means for retransmitting participation signals from audience response units further comprises means for relaying live real time audience responses from said family of local response units.

6. The repeater station of claim 3 wherein said subscriber station control means further comprises bi-directional communication means for a carrier frequency of the order of 218 MHz coupled with said local audience response units in said family to exchange data.

7. The repeater station of claim 3 wherein said audience participation response signals from the local audience to the satellite station comprise beeps of a 218 MHz carrier frequency.

8. The repeater station of claim 3 wherein the local station control means further comprises a narrow band single frequency transmission channel for communicating separately from TV programming.

* * * * *